No. 745,185. Patented November 24, 1903.

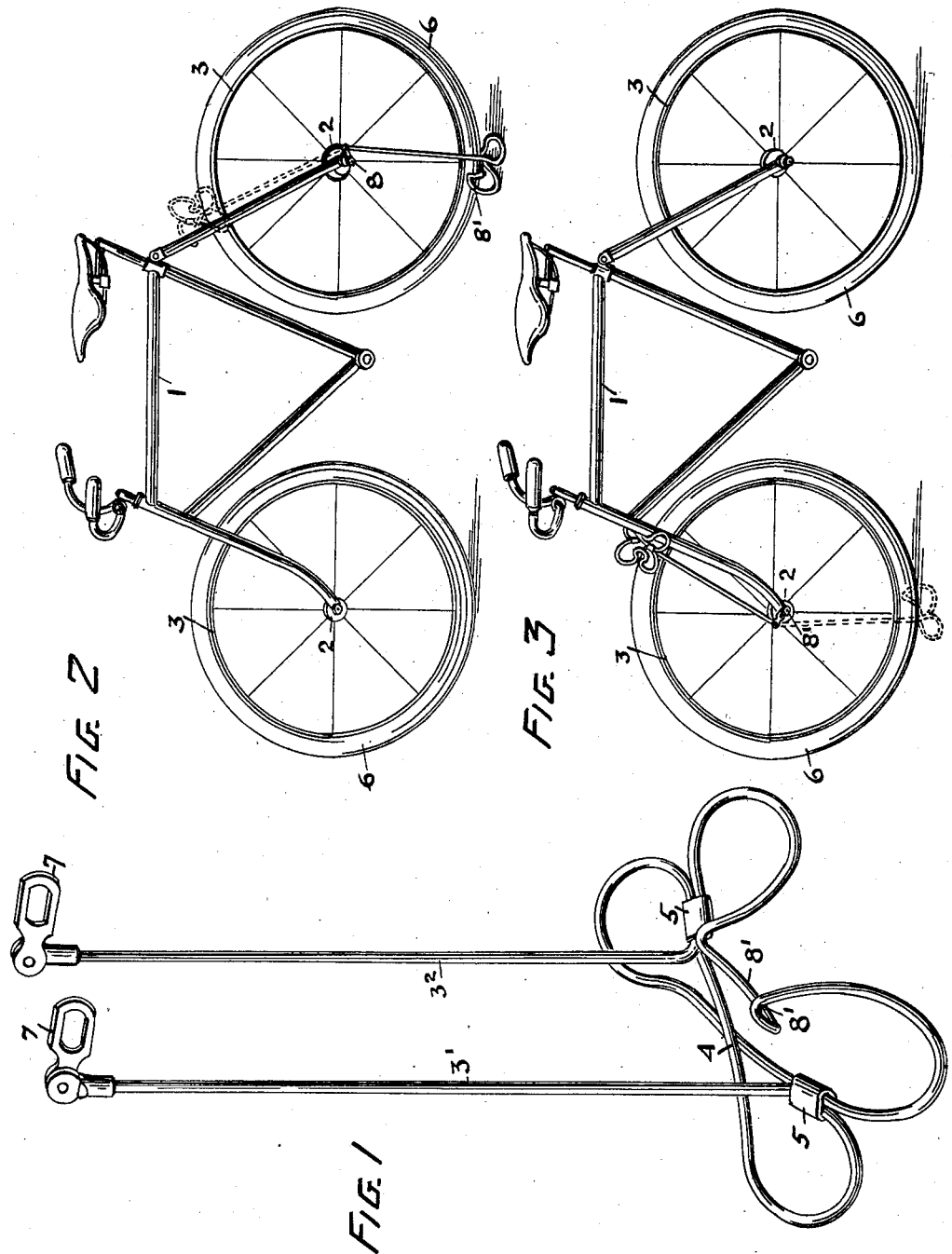

UNITED STATES PATENT OFFICE.

CHARLES G. HIGHTOWER, OF SAN MATEO, CALIFORNIA.

BICYCLE ATTACHMENT.

SPECIFICATION forming part of Letters Patent No. 745,185, dated November 24, 1903.

Application filed February 16, 1903. Serial No. 143,601. (No model.)

*To all whom it may concern:*

Be it known that I, CHARLES G. HIGHTOWER, a citizen of the United States, residing at San Mateo, county of San Mateo, State of California, have invented certain new and useful Improvements in Bicycle Attachments; and I do hereby declare the following to be a full, clear, and exact description of the same.

The present invention has for its object to provide a simple and inexpensive attachment which will serve as a bundle or parcel carrier for the wheel and as a stand or rest for holding the wheel or bicycle in an upright position when not in use, the device being so constructed as to permit of ready attachment to the bicycles as at present constructed.

To comprehend the invention, reference should be had to the accompanying sheet of drawings, wherein—

Figure 1 is a detail perspective view of the attachment removed from the wheel. Fig. 2 is a perspective view disclosing the attachment applied to a man's wheel, the position of the device when raised to serve as a parcel-carrier being shown by dotted lines; and Fig. 3 is a view similar to that disclosed by Fig. 2 of the drawings, illustrating the device as applied to a woman's wheel, the position of the attachment when lowered to serve as a stand being shown in dotted lines.

The numeral 1 is used to indicate the frame of an ordinary bicycle, and 2 the supporting-spindles for the wheels 3. The attachment hereinafter described may be secured to either spindle, 2 so as to act in connection with either wheel of the bicycle.

The attachment is a convertible one, serving as a parcel-carrier and a stand or rest for the bicycle, the function being dependent upon the use thereof made by the user of the machine. It comprises two legs 3' 3², united by an enlarged body portion or what shall be termed a "head" 4. The major portion of this body portion or head is in the same plane, so that a bearing-surface approximately the entire width of the body portion or head is obtained when the attachment is lowered or thrown downward. In the present case the entire attachment is composed of a single piece bent to form the head 4 and projecting legs 3' 3². When thus constructed, the head wires are held together by the clamps 5, so as to prevent spreading. However, the legs and head may be formed separately and united in any suitable manner. For economy in construction preference is given to the formation of the attachment from a single piece. The legs 3' 3² are separated a distance slightly greater than the width of the tire or wheel tread 6, and in length each leg is approximately one-half the diameter of the wheel which they straddle. To the free end of each leg is hinged a slotted connecting-link 7, which links are attached to either the forward or rear wheel spindle 2 by means of the securing-nuts 8, only one being illustrated. One edge of the enlarged body portion or the head 4, the inner edge as the device is viewed when in a lowered position, is bent upward at a slight rearward inclination, the central portion thereof being dropped, whereby there is formed a tire-seat 8, Fig. 1 of the drawings, which seat is made to conform to the shape of the wheel tire or tread 6. By thus upsetting, so to speak, one edge of the enlarged body or head the said tire seat is raised a distance above the body or head and the wheel, when engaged by the seat, held clear of the ground. By reason of the large bearing-surface given to the body or head a firm support for the wheel is obtained when the device is thrown downward and gives stability to the wheel when the tires are being inflated.

When the attachment is thrown upward, as indicated by dotted lines in Fig. 2 of the drawings and by full lines in Fig. 3 of the drawings, the same will stand at a slight inward inclination, the head 4 resting against the forks of the bicycle and in this position serves as a parcel or bundle carrier. As the attachment is lowered the seat 8' bears against the tire or tread of the wheel, when the head 4 rests or bears firmly against the surface of the ground, as shown in full lines in Fig. 2 of the drawings and by dotted lines in Fig. 3 of the drawings. In this position the attachment serves as a stand or support for holding the wheel in vertical position. By reason of the slotted link connection the distance of the head 4 from the wheel-spindle is slightly less when the attachment is lowered than when raised. Hence the same binds firmly against the tire or tread when in the position illustrated by full lines in Fig. 2 and by dotted lines in Fig. 3 of the drawings in order to hold the wheel locked. In releasing the wheel it is only required to move the machine slightly forward or backward, depending upon the wheel to which the attachment is applied, when the attachment will be carried upward a certain distance by the movement of the wheel, so as to be placed in a convenient position to be thrown by the user of the wheel against the wheel-forks.

The described device will be found of great convenience as a support for holding the wheel in an upright position for the inflation of the bicycle-tires, as it avoids the necessity of having to rest the wheel upon the ground or against buildings, fences, and trees for this purpose.

By reason of the slotted link connection between the legs of the attachment and the wheel-spindle a certain amount of adjustment may be given to the attachment or at least an adjustment sufficient to adapt the attachment for variation in the size of wheels.

Having thus described the invention, what I claim as new, and desire to secure protection in by Letters Patent, is—

1. A combined parcel-carrier and support for bicycles, the same comprising an enlarged head having the major portion of its surface in approximately the same horizontal plane, one edge of the head being bent at an inward inclination, a seat for the reception of the wheel's tire formed in the upset edge of the head, uniting legs extending from the enlarged head and means whereby the legs are hinged and detachably connected to the spindle of a bicycle.

2. A combined carrier and support for bicycles, the same consisting of a single piece of wire bent to form an enlarged head of crossed wire suitably connected, the major portion of the head being in approximately the same horizontal plane, one edge of the formed head being thrown at an inward inclination to the main body and centrally bent toward the main body portion or head to provide a seat for the reception of the wheel's tire, the crossed wires continuing at right angles to the body portion or head into spaced legs which straddle the wheel of the bicycle.

In witness whereof I have hereunto set my hand.

CHARLES G. HIGHTOWER.

Witnesses:
 JOHN L. SCOTT,
 FREDERICK BIRDSALL.